Dec. 20, 1966 K. V. MINA 3,293,625

MULTI-APERTURE CORE SHIFT REGISTER

Filed Sept. 18, 1963 2 Sheets-Sheet 1

INVENTOR
K. V. MINA
BY William H. Kamstra
ATTORNEY

MULTI-APERTURE CORE SHIFT REGISTER

Filed Sept. 18, 1963 2 Sheets-Sheet 2

PRIMED (1)

PRIMED (0)

United States Patent Office 3,293,625

Patented Dec. 20, 1966

3,293,625

MULTI-APERTURE CORE SHIFT REGISTER

Kent V. Mina, Ridgewood, N.J., assignor to Bell Telephone Laboratories, Incorporated, New York, N.Y., a corporation of New York Filed Sept. 18, 1963, Ser. No. 309,634
10 Claims. (Cl. 340—174)

Figure 1:
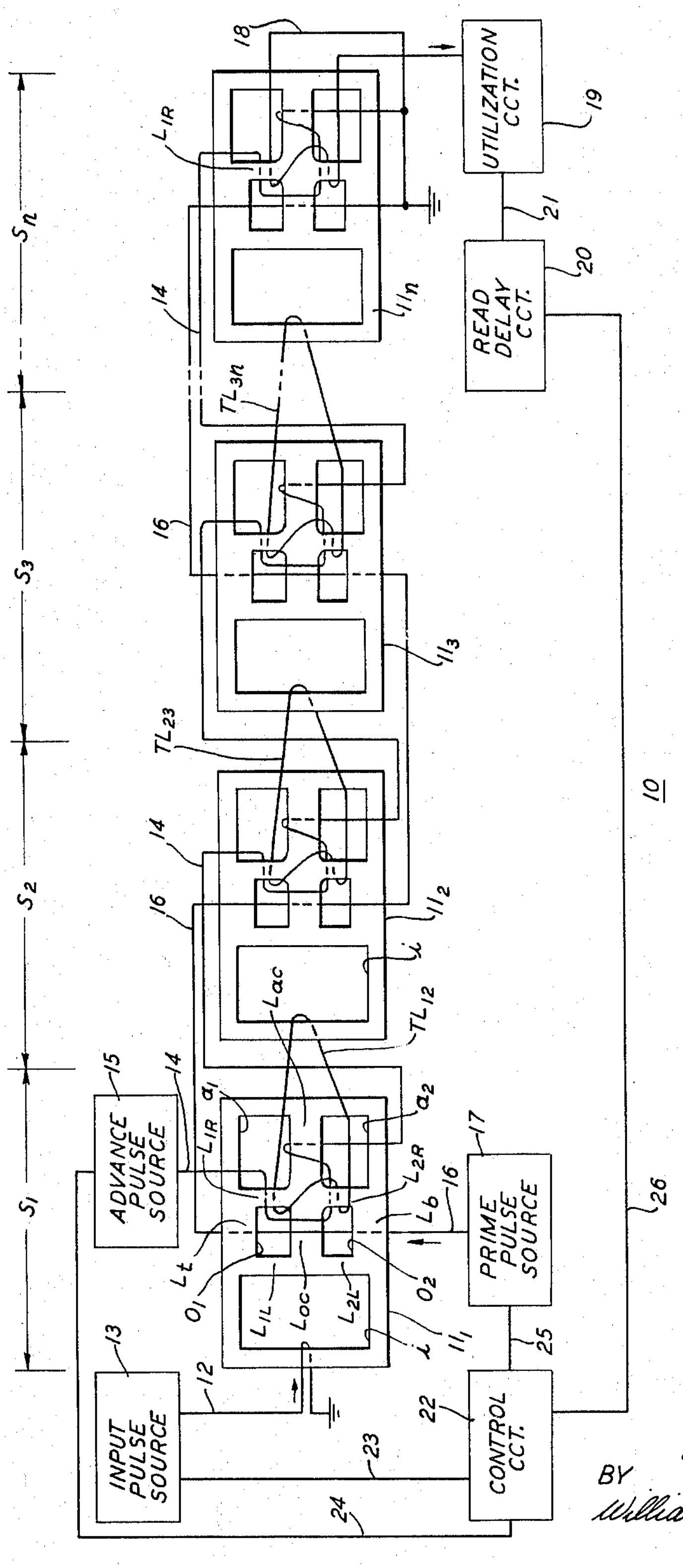

This invention relates to information processing circuits and, more particularly, to magnetic shift register circuits.

Magnetic memory elements in which information is stored in the form of representative magnetic states are well known and have gained wide prominence in the data processing and switching art. Their extreme reliability, stability and ease of maintenance have earned for such elements, as, for example, the well known toroidal cores, favorable positions in the binary information handling field. The ferromagnetic and ferrimagnetic materials of which such cores are formed display substantially rectangular hysteresis characteristics, and a binary information bit may be stored in a core as one or the other condition of remanent magnetization. The core then remains in the representative remanent condition until an applied magnetomotive force switches the core to the opposite remanent condition during a read-out phase of the information handling operation as is well known.

Magnetic toroidal cores have been employed in numerous applications of specific circuits, and such arrangements as memory matrices, delay lines, and logic circuits, to name a few, are amply represented in the art. All of these applications have made highly advantageous use of magnetic cores. As is to be expected, however, many of the known circuit configurations have necessitated some modification in view of the inherent characteristics and manner of operation peculiar to the toroidal cores. Thus, for example, it is obvious that the switching of a core from either of its conditions of remanent magnetization to the other induces, in windings inductively coupled thereto, output voltages of equal amplitudes but opposite polarities depending upon whether the core is being "set" or "reset." In circuits operating repetitively, such as core logic circuits, the flux in a core must be reversed an even number of times with the result that for every forward transfer of information, that is, a flux reversal in one direction, there will also be a backward transfer of information, that is, a flux reversal in the opposite direction. Such a backward transfer is, in many instances, undesirable and must be countered in some manner. In a series arrangement in which each core is connected to an adjacent core by means of a coupling loop, and in which the cores are switched sequentially, such a backward transfer caused by the switching of one core may well, in fact, prevent the setting of a preceding core.

Normally, in core logic circuits, for example, the above inherent effects are reduced and maintained within operating limits by the use of operating diodes and also by suitably selecting the turns ratios of the core input and output windings. In connection with the former expedient, for obvious reasons, it frequently becomes advantageous to reduce to a minimum the number of additional components, such as diodes, which are introduced into a circuit arrangement. One approach to this problem has been the use of a magnetic structure in which the problem of back transfer does not arise. Patent No. 3,045,215, of U. F. Gianola, issued July 17, 1962, for example, discloses an information processing circuit using multiapertured cores to avoid the problem of back transfer.

This patent describes a novel magnetic shift register each stage of which includes two multiapertured cores and two intercore coupling windings commonly termed "transfer loops." Experience has shown that the cost of each transfer loop between the cores represents a substantial part of the cost of the register, not only because of the time required to thread the loop through the cores, but also because of the cost of the solder connection therein. Moreover, the reliability of such shift register circuits depends, to a large extent, on these solder connections. Accordingly, there is considerable merit to any approach which can reduce the total number of transfer loops needed. The patent further describes a shift register wherein binary information is shifted from one core to another in two operative phases commonly termed the prime and the advance phase, the prime phase acting to shift information into the output portion of a core, the advance phase acting not only to shift information to the next succeeding core but also to clear, that is, to drive, to an informationless condition the next preceding core. Thus, four phases are required to transfer information from stage to stage. Moreover, each operative phase usually requires its own driver and is time consuming. Consequently, any reduction in the number of operative phases reduces the total number of drivers required and enables an increased operational repetition rate.

Accordingly, it is an object of this invention to provide a new and novel multistage information transfer circuit which is highly reliable and, advantageously, inexpensive.

The objects of the present invention are realized in one specific illustrative shift register including a single multiapertured core per stage for which the clear state is undefined, and for which only two operative phases are required to transfer information from one stage to the next. Each core in the register is apertured to include a single input flux path and two output flux paths, the output flux paths of the core of one stage being coupled by a transfer loop also coupling the input flux path of the core of the next succeeding stage. Information is introduced, in response to input pulses of a first and second polarity, to a core of a register as a first or second magnetic state in the input flux path there. The information is transferred, in response to a limited amplitude prime pulse in a prime circuit, to a particular one of the two output flux paths determined by the direction of flux in the input flux path. The information is transferred to the input flux path of the core of the next succeeding stage, via the transfer loop, in response to an advance pulse in an advance circuit which switches flux in only the output flux path previously switched.

Thus, a feature of a shift register in accordance with this invention is a multiapertured magnetic core including first and second output flux paths rendered responsive, by first and second polarity input signals respectively, to a prime pulse of limited amplitude.

Another feature of a shift register in accordance with this invention is prime and advance circuits enabling two-phase operation per stage.

A further feature of a shift register in accordance with this invention is a single transfer loop per stage coupling the two output flux paths of the core of one stage and also coupling the single input flux path of the core of the next succeeding stage.

Figure 2A:
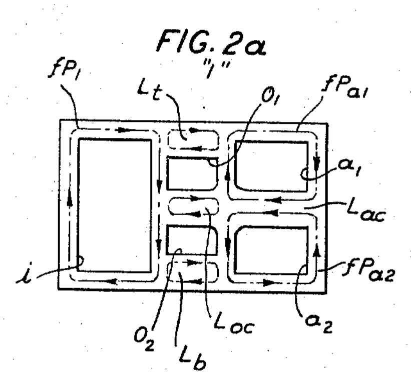
Figure 2C:
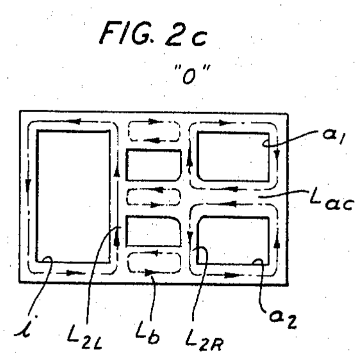
Figure 2B:
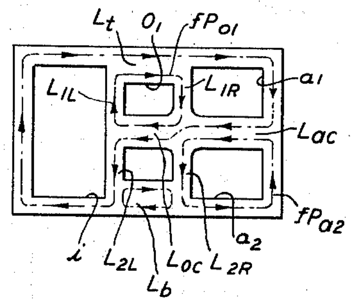
Figure 2D:
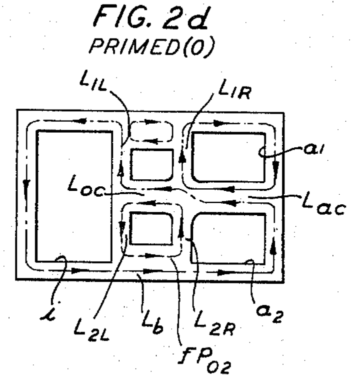
Figure 3:
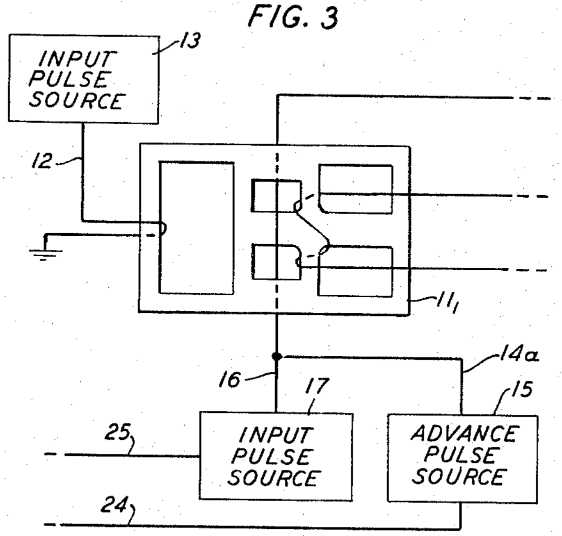

The invention and its objects and features will be more fully understood from a consideration of the detailed description of an illustrative embodiment thereof rendered in conjunction with the accompanying drawing wherein:

FIG. 1 is a schematic diagram of an illustrative shift register in accordance with this invention;

FIGS. 2*a*, 2*b*, 2*c* and 2*d* are diagrams of the various flux patterns exhibited by a multiapertured core in accordance with this invention; and FIG. 3 depicts the initial stage of the initial portion of another specific embodiment in accordance with this invention.

It is to be understood that the figures are not necessarily to scale, certain exaggerations of various dimensions therein having been made for illustrative purposes.

FIG. 1 shows a shift register 10 comprising a plurality of stages $S_1$, $S_2$, $S_3$, . . . $S_n$ each comprising a single multiapertured core 11. Each core has substantially rectangular hysteresis characteristics and bears a subscript corresponding to that of its stage. Each of the multiapertured cores includes a relatively large input aperture *i*, two smaller output apertures $o_1$ and $o_2$, arranged generally vertically with respect to one another, and two additional apertures $a_1$ and $a_2$ of intermediate size, also arranged generally vertically, the arrangement of apertures defining, essentially, four generally vertical legs having generally horizontal cross-legs therebetween. The purpose of the various apertures, legs, and cross-legs defined thereby will be made apparent during the description of the operation of the shift register 10 hereinafter.

The input aperture *i* of each core defines thereabout magnetic legs and cross-legs of substantially equal minimum cross-sectional area and, thus, substantially equal flux carrying capacity. These magnetic legs and cross-legs constitute the input flux path and are designated $fp_i$ as shown in FIG. 2*a*. The flux carrying capacity of flux path $fp_i$ is taken as $\varphi$ units symbolized as a single arrow.

The apertures $o_1$ and $o_2$ define thereabout magnetic legs and cross-legs of unequal minimum cross-sectional area. Accordingly, the flux carrying capacities of the various legs and cross-legs differ from one another. These legs and cross-legs can be designated most simply in terms of their relative position with respect to the apertures they adjoin as viewed in FIG. 1. Accordingly, apertures $o_1$ and $o_2$ define a common cross-leg therebetween which may be designated $L_{oc}$; each aperture $o_1$ and $o_2$ has legs to the right and left which legs may be designated $L_{1R}$, $L_{1L}$ and $L_{2R}$, $L_{2L}$, respectively. The cross-leg on top of aperture $o_1$ may be designated $L_t$, and the cross-leg below aperture $o_2$ may be designated $L_b$. Apertures $a_1$ and $a_2$ define a common cross-leg therebetween which may be designated $L_{ac}$. Although there are additional legs and cross-legs defined about the apertures *i*, $a_1$, and $a_2$ in the structure, they are not specifically designated because their participation in the operation of the shift register is more amenable to general description as included in flux paths $fp_i$, $fp_{a1}$, and $fp_{a2}$, respectively, than to specific description. Flux paths $fp_i$, $fp_{a1}$ and $fp_{a2}$ are shown in FIG. 2*a*.

A conductor 12, threaded through aperture *i* of core $\mathbf{11}_1$ of the initial stage of the register, is connected between an input pulse source 13 and ground. A conductor 14, coupling serially, in opposing sense, legs $L_{1R}$ and $L_{2R}$ and also coupling cross-leg $L_{ac}$ of each core $\mathbf{11}_1$, $\mathbf{11}_2$, $\mathbf{11}_3$, . . . $\mathbf{11}_n$, consecutively, is connected between an advance pulse source 15 and ground. A conductor 16, coupling, in a like sense, the cross-leg $L_{oc}$ of each core $\mathbf{11}_1$, $\mathbf{11}_2$, $\mathbf{11}_3$, . . . $\mathbf{11}_n$, is connected between a prime pulse source 17 and ground. A separate transfer loop TL, bearing subscripts indicating the cores coupled thereby, couples each pair of adjacent cores. Specifically, each transfer loop couples serially, in a like sense, legs $L_{1R}$ and $L_{2R}$ of one core and is threaded through the input aperture of the next adjacent core. The transfer loops, in addition, advantageously contain no other electrical elements, and only the properties inherent in the loop, such as the inherent resistance, will have any effect on the currents in the loop. A conductor 18, coupling, in a like sense, legs $L_{2R}$ and $L_{1R}$ of core $\mathbf{11}_n$ of the terminal stage of the register is connected between a utilization circuit 19 and ground. A read delay circuit 20 is connected to utilization circuit 19 by means of a conductor 21. A control circuit 22 is connected to the pulse sources 13, 15, and 17, and read delay circuit 20 by means of conductors 23, 24, 25, and 26, respectively.

In operation, a core in the shift register of FIG. 1 is in one of four magnetic conditions. These four conditions are shown in FIGS. 2*a*, 2*b*, 2*c* and 2*d* and will be discussed separately for providing a convenient reference in the later discussion of the operation of the shift register. In order for the flux conditions of FIGS. 2*a*, 2*b*, 2*c* and 2*d* to be realized, various cross-legs of the cores have twice the flux carrying capacity of other legs. Such cross-legs, shown in FIG. 2*a* as having two arrows and, thus, $2\varphi$ units of flux therein, where each arrow represents $\varphi$ units of flux, are cross-legs $L_t$, $L_{oc}$, $L_b$ and $L_{ac}$. The remaining legs and cross-legs have only a single arrow therein representing $\varphi$ units of flux. Specifically, as was stated hereinbefore, no clear state is defined for a core in the shift register of FIG. 1. A core can be in only the information condition or the primed condition, which conditions differ for positive and negative information. The positive information condition, representing a binary "1," is shown in FIG. 2*a*. Flux is shown there directed in a clockwise direction about the input aperture *i*; the cross-legs $L_t$, $L_{oc}$ and $L_b$ are magnetically neutral as represented in the figure by an arrow in each direction. Flux about apertures $a_1$ and $a_2$, in flux paths $fp_{a1}$ and $fp_{a2}$, is directed clockwise and counterclockwise, respectively.

FIG. 2*b* shows the primed condition for positive information. In that figure, flux is directed clockwise about aperture $o_1$ in the flux path conveniently termed $fp_{o1}$. The remaining flux for the primed condition can be rationalized in several ways as long as flux continuity is preserved. One convenient way is shown in FIG. 2*b* where flux about aperture $a_2$ in flux path $fp_{a2}$ is shown counterclockwise; flux about aperture $a_1$ is clockwise except that flux closure therefore is shown, not through leg $L_{1R}$, but through cross-leg $L_{oc}$, leg $L_{2L}$, clockwise about the input aperture *i* and through cross-leg $L_s$.

FIG. 2*c* shows the flux condition for negative information representing a binary "0." The condition is quite similar to that shown in FIG. 2*a* for positive information. The difference is that here flux is directed counterclockwise around the input aperture *i* rather than clockwise as shown in FIG. 2*a*. Similarly, the flux condition for negative information primed is, as shown in FIG. 2*d*, quite, similar to that shown in FIG. 2*b* for positive information primed. The difference therebetween is that here flux switching is in the counterclockwise direction about aperture $o_2$, in a flux path conveniently termed $fp_{o2}$, rather than in a clockwise direction about aperture $o_1$ as shown in FIG. 2*b*. The switching, in this instance, requires a switching of cross-leg $L_b$, leg $_{2R}$, cross-leg $L_{oc}$ and leg $L_{2L}$. The remaining flux is directed clockwise about aperture $a_1$, in flux path $fp_{a1}$ and directed counterclockwise about aperture $a_2$ except that flux closure is through cross-leg $L_{oc}$, through leg $L_{1L}$, counterclockwise about input aperture *i*, and through cross-leg $L_b$.

In light of the above-described organization of the shift register of FIG. 1, and the flux conditions which its cores can assume in accordance with this invention, an illustrative operation thereof will now be described. For this description, all cores are assumed to be in the positive information condition initially. Of course, all the cores may be assumed to be in the negative information condition, or some cores may be in the positive and some in the negative conditions. As will become evident hereinafter, the initial condition of the cores is of little consequence in the instance of a marker pulse described hereinafter. The operation, then, for an illustrative pattern of information assumed as being 1, 0, 1 follows.

Initially, the prime pulse source 17 is activated under the control of control circuit 22. In this connection, the prime pulse source 17 may comprise any pulse source capable of providing pulses for producing the flux changes required in accordance with this invention. The control circuit 22 may comprise any circuit capable of activating the various pulse sources and the read delay circuit 20 in accordance with this invention. The prime pulse source 17 applies to conductor 16 a prime pulse for driving the cross-legs $L_{oc}$ of all the cores in the register to the left as viewed in FIG. 1. As is conventional, the prime pulse has a limited amplitude and is restricted here to an amplitude less than that required for switching about an input aperture *i*. All the cores in the register, initially, are in the positive information condition shown in FIG. 2*a*. Accordingly, the cross-leg $L_{oc}$ of each core is switched by the prime pulse. Thus, all the cores are driven to the primed condition shown in FIG. 2*b* wherein flux about aperture $o_1$, in flux path $fp_{o1}$, is driven clockwise, switching the flux in the legs and cross-legs thereabout including leg $L_{1R}$. The switching of each leg $L_{1R}$, because of the limited amplitude of the prime pulse, produces insufficient magnetomotive force in the associated transfer loops to induce flux switching about the input aperture of the next adjacent core. Therefore, in response to the prime pulse, only insignificant flux shuttling is induced, by means of a transfer loop, in the next adjacent cores. The first or prime phase of operation is now complete.

Subsequently, the input pulse source 13 and the advance pulse source 15 are activated, simultaneously, under the control of control circuit 22. In this connection, the input pulse source 13 and the advance pulse source 15 may comprise any bipolar pulse source and unipolar pulse source, respectively, capable of providing pulses for producing the flux changes required in accordance with this invention. Input pulse source 13 applies to conductor 12 an input pulse, assumed to be positive, for driving the flux in the input flux path $fp_i$ of core $11_1$ to the clockwise direction shown in FIG. 2*a*. Core $11_1$, however, prior to the input pulse is in the primed condition shown in FIG. 2*b*, the flux in its flux path $fp_i$ already being directed clockwise. Accordingly, only flux shuttling results therein. The advance pulse source 15 simultaneously applies an advance pulse to conductor 14 for driving upward and downward legs $L_{1R}$ and $L_{2R}$ of all the cores in the register respectively and driving cross-leg $L_{ac}$ thereof to the left, all directions being as viewed in FIG. 1. In this connection, the advance pulse has an amplitude sufficient to switch flux about an input aperture by means of a transfer loop. Since all the cores 11, prior to the advance pulse, are in the prime condition shown in FIG. 2*b*, the leg $L_{1R}$ of each core in the register is switched in response to the advance pulse. The switching of each leg $L_{1R}$ provides in the transfer loop associated therewith a pulse of sufficient amplitude to drive clockwise the flux about the input aperture of the next adjacent core, the switching of leg $L_{1R}$ of the terminal core $11_n$ providing a pulse in conductor 18 which could activate the utilization circuit 19 as is also the case in conventional shift register circuits. Activation of the utilization circuit at this time may be prevented by providing the read delay circuit 20. The activation of the utilization circuit may in this manner be delayed until the information now in stage $S_1$ is advanced through the register and is transferred out of the *n*th stage. In this connection, the read delay circuit may be any means for delaying the read out of information. One example of a suitable means for accomplishing the read delay function would be an *n* stage counter which activates the utilization circuit after the count of *n*. Another example would be the provision of a marker pulse, say a "0," preceding the input information, and the provision of a gate responsive to this "0" for activating the utilization circuit. Both expedients can be thought of as represented by the read delay circuit 20 and conductor 26.

The second or advanced phase of operation, and, thus, the first cycle of operation, is now complete; a "1" is stored in stage $S_1$. Further information is introduced into the initial stage of the register, and information already stored there is shifted through the register by a repetition of the prime and advance phases.

For introducing a "0" into the register, in accordance with the illustrative operation, the prime pulse source 17 is again activated as described previously. Since the cores still are in the positive information condition, the response thereby to the prime pulse is as described previously, all the cores being driven to the primed condition shown in FIG. 2*b*.

Later, the input pulse source 13 and the advance pulse source 15 are again activated as described previously. This time, however, the input pulse source 13 provides in conductor 12 an input pulse of negative polarity driving counterclockwise the flux in flux path $fp_i$ about aperture *i* in core $11_1$. The advance pulse source 15 simultaneously provides an advance pulse in conductor 14 which pulse again drives upward and downward, respectively, legs $L_{1R}$ and $L_{2R}$ and drives to the left cross-leg $L_{ac}$, all directions as viewed in FIG. 1. FIG. 2*b*, illustrating the flux condition of core $11_1$ prior to the input and advance pulses, indicates that only the flux in leg $L_{1R}$ is in a direction to be switched by the advance pulse. Accordingly, leg $L_{1R}$ switches upward, the core $11_1$ being driven thereby into the condition shown in FIG. 2*c*. The switching of leg $L_{1R}$ induces a pulse in transfer loop $TL_{12}$. This induced pulse is of a polarity to drive clockwise the flux about the input aperture *i* of core $11_2$. The second cycle of operation is now complete. Stage $S_1$ has a "0" stored therein, the flux condition being illustrated by FIG. 2*c*; stage $S_2$ has a "1" stored therein, the flux condition being illustrated by FIG. 2*a*. Although similar flux changes occur in later stages in the register in response to pulses induced in transfer loops $TL_{23}$ and $TL_{3n}$, these changes, as those in the previous cycle of operation, are not described because the utilization circuit will disregard all signals until the initial "1," now in stage $S_2$, is read out of stage *n*.

An additional "1," in accordance with the illustrative operation, is stored in the register again by repeating the prime and advance phases of operation. The prime pulse source 17 is again activated as described previously. Core $11_1$ is driven thereby from a condition shown in FIG. 2*c* to that shown in FIG. 2*d*. Core $11_2$ is driven thereby from a condition shown in FIG. 2*a* to that shown in FIG. 2*b*.

Subsequently, the input and advance pulse sources are activated as described previously. The input pulse, this time, is of a positive polarity for switching clockwise the flux about the input aperture *i* of core $11_1$. Simultaneously, the advance pulse applied to conductor 14 by the advance pulse source 15 drives upward and downward legs $L_{1R}$ and $L_{2R}$, and drives cross-leg $L_{ac}$ to the left in all the cores in the register, all directions as viewed in FIG. 1. Core $11_1$, prior to the input and advance pulses applied here, was in a flux condition shown in FIG. 2*d*. In response to the input pulse, flux in flux path $fp_i$ about input aperture *i* of core $11_1$ switches clockwise; in response to the advance pulse, flux in legs $L_{2R}$ thereof switches downward, as viewed in FIG. 2*a*. Accordingly, in response to these pulses, core $11_1$ switches from a flux condition shown in FIG. 2*d* to that shown in FIG. 2*a*. Thus, a binary "1" is stored in stage $S_1$. In addition, the switching of leg $L_{2R}$ of core $11_1$ induces a pulse, in transfer loop $TL_{12}$, of a polarity to drive counterclockwise the flux in flux path $fp_i$ about the input aperture *i* of core $11_2$. Prior to this pulse in transfer loop $TL_{12}$ and the advance pulse, core $11_2$ was in a flux condition shown in FIG. 2*b*. Accordingly, in response to the advance pulse, leg $L_{1R}$ of core $11_2$ switches upward. Core $11_2$, then, is driven by the pulse in transfer loop $TL_{12}$ and the advance pulse to a flux condition shown in FIG. 2*c* representing a binary "0." The switching of leg $L_{1R}$ in core $11_2$, in turn, produces a pulse in transfer loop $TL_{23}$ which drives clockwise the flux in flux paths $fp_i$ about the input aperture *i* of core $11_3$. Also, since core $11_3$ was in the flux condition shown by FIG. 2*b*, the advance pulse drives upward the leg $L_{1R}$ thereof; the core $11_3$ is driven to the flux condition shown in FIG. 2*a*. Thus, a "1" is stored in stage $S_3$.

Alter three cycles of operation, the information 1, 0, 1 has been introduced and advanced through the register, each cycle of operation requiring only two operative phases. Additional information is introduced into the register and advanced in the manner described until the initial bit arrives at stage $S_n$. The next subsequent bit, that is, the $(n+1)$th bit of information requires the read out of the bit in stage $S_n$. At this juncture, the read delay circuit 20, under the control of control circuit 22, has activated the utilization circuit 19. Since the first bit introduced into the register was a "1," a "1" is read out first. Core $\mathbf{11}_n$ then would be in a flux condition shown in FIG. 2*b*; the subsequent advance pulse switches its leg $L_{1R}$ upward, as viewed in FIG. 2*c*, thus inducing a pulse of a positive polarity in conductor 18. Had a binary "0" been stored first, a negative pulse in conductor 18 would be provided. Of course, the polarities of the pulses may be changed, and the senses of the couplings to the various cores may be altered, as is well known in the art.

The apertures $i$, $o_1$, $o_2$, $a_1$, and $a_2$ of each of the cores in the register are shown having various sizes. These sizes are consistent with normal design considerations. Specifically, apertures $o_1$ and $o_2$ are of substantially equal dimensions primarily to maintain substantially equal the prime margins for the "1" and the "0" primed conditions. The $i$ aperture is larger than the $o_1$ and $o_2$ apertures to preclude switching thereabout by the prime pulses. The $a_1$ and $a_2$ apertures are necessary only for providing flux closure as described; ideally, there is no switching thereabout in accordance with this invention. The $a$ apertures are not necessarily equal and are larger than apertures $o_1$ and $o_2$ only to make them easier to thread, and, also, to provide increased margins for the prime and advance pulses in that a flux path thereabout is eliminated as a possibility for flux closure. One other consideration, important in the provision of a suitable multiapertured core in accordance with this invention, is that the distances between apertures $o_1$ and $a_2$, and $o_2$ and $a_1$ are advantageously greater than the square root of five units and typically equal to or greater than three units of cross-sectional area where the cross-sectional area of the input flux path is one unit for handling $\varphi$ units of flux. This enables the magnetic material to accommodate the three units of flux there (see FIGS. 2*b* and 2*d*). This dimension is achieved, in one manner, simply by not cutting sharply the appropriate corners of the apertures $a_1$, $a_2$, $o_1$ and $o_2$ as shown. If these dimensions are smaller than suggested, the turns ratio for the transfer loop may be increased, for example, to 3:1 for achieving sufficient gain. The normal turns ratio is 2:1, but may be more or less in accordance with the relation $n$:1 where $n$ is greater than 1.

Although the invention has been described in terms of a shift register requiring separate conductors for the prime and advance pulse sources, the conductor for the advance pulse source may be eliminated and the advance pulse source connected directly to the conductor to the prime pulse source. A portion of such an arrangement is shown in FIG. 3. Only as much of the first stage of the register of FIG. 1 as is necessary for illustrating this variation is shown. FIG. 3 shows the advance pulse source 15 connected directly to the conductor 16 by a conductor 14*a*. The conductor 16, itself, is as shown in FIG. 1. Also, the coupling to the cores of the later stages is as shown in FIG. 1 with the omission of conductor 14. The pulse sources and the control and utilization circuits may comprise any pulse source and circuit as described hereinbefore with the single provision that the advance pulse source provides pulses of a polarity opposite to that applied in the embodiment of FIG. 1. In addition, it is well known that the prime pulse is of relatively long duration and may even be supplied by a direct current source.

What have been thus described are considered to be only illustrative embodiments of this invention. Accordingly, various and numerous other arrangements may be devised by one skilled in the art without departing from the spirit and scope of this invention. For example, the input and utilization circuits described may be modified to provide serial-parallel, parallel-serial and parallel-parallel operation as well as the serial-serial operation described. Such modifications are within the purview of one skilled in the art.

What is claimed is:

1. In a combination, a plurality of cores, each having substantially rectangular hysteresis characteristics and being apertured to provide an input flux path and first and second output flux paths, said input flux path having a first leg, said first and second output flux paths including different portions of said first leg, a plurality of transfer loops each coupling said first and second output flux paths of a different one of said cores and the input flux path of a next adjacent core, first signal means coupled to said cores for driving said cores to an initial binary representation, and two-phase signal means coupled to said plurality of cores for advancing said initial representation from core to core.

2. In combination, a plurality of cores including an initial core and a terminal core, each of said plurality of cores having substantially rectangular hysteresis characteristics and each including five apertures defining an input flux path, first and second output flux paths, and first and second additional flux paths, said input flux path having a first leg, said first and second output flux paths including different portions of said first leg, said first and second output flux paths sharing a first common leg, said first and second additional flux paths sharing a second common leg, a plurality of transfer loops each coupling said first and second output flux paths of a different core and the input flux path of a next adjacent core, first signal means coupled to said cores for driving said cores to an initial binary representation, and two-phase signal means coupled to said cores for advancing said initial representation from core to core.

3. A combination in accordance with claim 2 wherein said first signal means includes bipolar input signal source means inductively coupled to the input flux path of said initial core.

4. A combination in accordance with claim 3 including utilization circuit means inductively coupled, in opposing sense, to said first and second output flux paths of said terminal core.

5. A combination in accordance with claim 4 wherein said two-phase signal means includes a first conductor coupled, in a like sense, to said first common leg of each of said plurality of cores consecutively.

6. A combination in accordance with claim 5 further including a second conductor coupled, in opposing sense, to said first and second output flux paths and to said second common leg of each of said plurality of cores consecutively.

7. A shift register circuit comprising a plurality of stages including an initial and a terminal stage, each of said stages including a magnetic core having substantially rectangular hysteresis characteristics, each of said magnetic cores including a plurality of apertures therein defining an input flux path and also defining first and second output flux paths intercoupled with said input flux path such that the direction of flux in said input flux path enables the flux in only one of the output flux paths to switch in response to a switching pulse of limited amplitude, bipolar input means coupled to the input flux path of the core of said initial stage for driving the flux therein selectively to first and second magnetic states, a plurality of transfer loops each coupled to the first and second output flux paths of the core of a different stage and the input flux path of the core of the next adjacent stage, limited amplitude pulse means coupled to said first and second output flux paths of each stage for switching to a first magnetic state the flux in the enabled output flux paths, and large amplitude pulse means coupled to said first and second output flux paths of each stage for switching to a second magnetic state the flux in said enabled output flux paths, the corresponding transfer loops being responsive to said last mentioned switching for driving selectively to first and second flux states the input flux paths of the cores of the corresponding next adjacent stages.

8. A shift register circuit in accordance with claim 7 also including bipolar utilization means coupled to said first and second output flux paths of said terminal stage.

9. A shift register circuit comprising first and second stages, each of said stages including a magnetic core having a plurality of apertures therein defining an input flux path and also defining first and second output flux paths intercoupled with said input flux path such that the direction of flux in said input flux path enables the flux in only one of the output flux paths to switch in response to a switching pulse of limited amplitude, bipolar input means coupled to the input flux path of the core of said first stage for driving the flux therein selectively to first and second magnetic states, a transfer loop coupling the first and second output flux paths of said first stage with the input flux path of said second stage, limited amplitude pulse means coupled to the first and second output flux paths of said core of said first stage for switching to said first magnetic state the flux in the enabled flux path, and large amplitude pulse means coupled to the first and second output flux paths of the core of said first stage for switching to said second magnetic state the flux in said enabled output flux path, said transfer loop being responsive to said last mentioned switching for driving selectively to first and second magnetic states the input flux path of said second stage.

10. A magnetic core having substantially rectangular hysteresis characteristics, said core having five apertures defining first, second, third, and fourth substantially parallel legs substantially of a first minimum cross-sectional area, said first and second, and said third and fourth legs being connected, respectively, by first and second, and third and fourth cross-legs having said first minimum cross-sectional area, said third and fourth legs being connected by a fifth cross-leg having a second minimum cross-sectional area substantially twice said first minimum cross-sectional area, said second and third legs being connected by sixth, seventh, and eighth cross-legs having substantially said second minimum cross-sectional area.

References Cited by the Examiner

UNITED STATES PATENTS

| | | | |
|---|---|---|---|
| 3,195,117 | 7/1965 | Engelbart | 340—174 |
| 3,243,775 | 3/1966 | English | 340—174 |

OTHER REFERENCES

IBM Technical Disclosure Bulletin, "Transducer Device" by R. S. Hill, vol. 4, No. 4, September 1961, pages 51 and 52.

BERNARD KONICK, *Primary Examiner.*

S. URYNOWICZ, *Assistant Examiner.*